Aug. 13, 1940.                S. BOLLING                2,211,051
                           RUBBER BALE CUTTER
                          Filed May 25, 1939           2 Sheets-Sheet 1
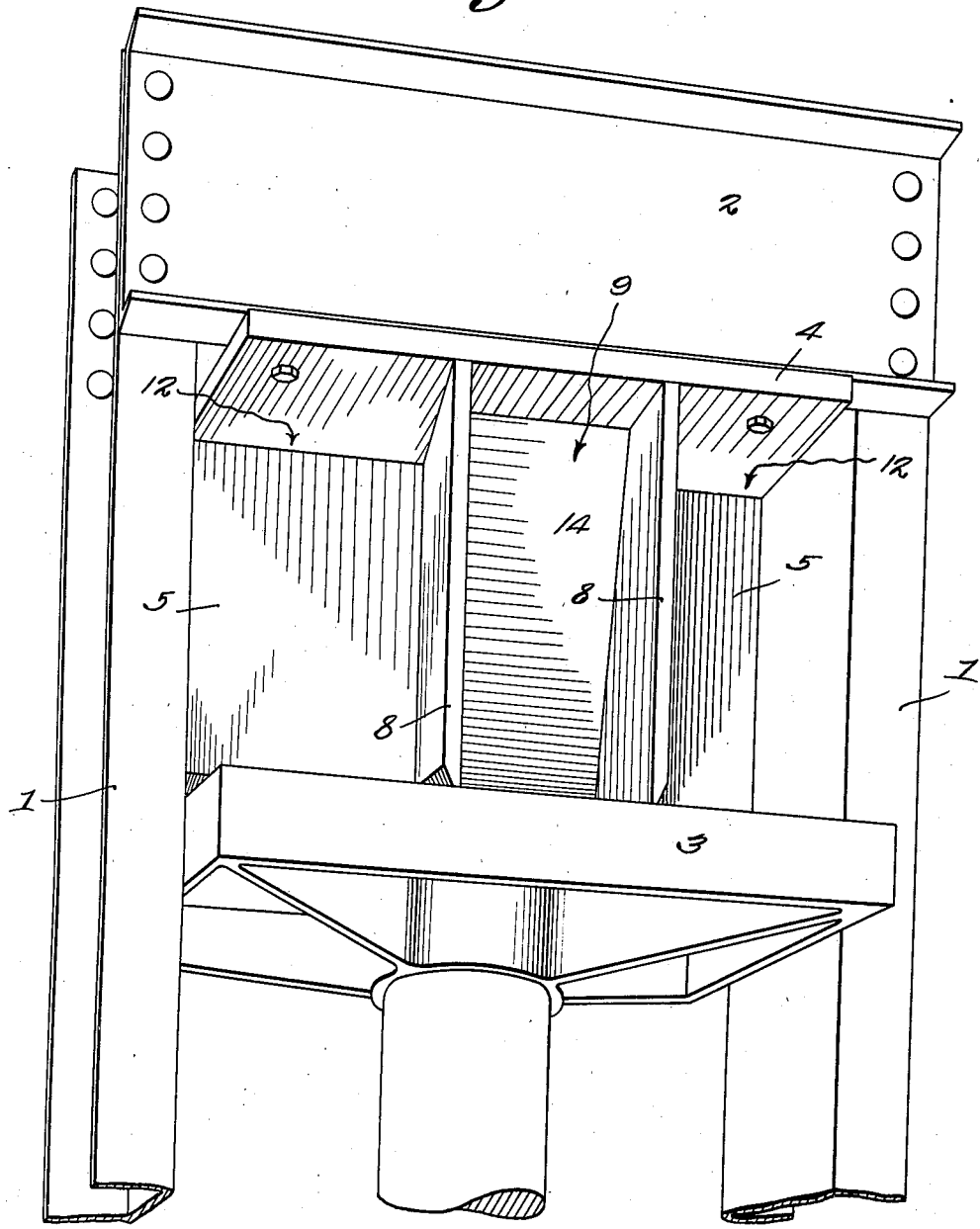
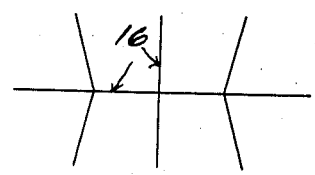
INVENTOR.
ATTORNEYS.

Aug. 13, 1940.  S. BOLLING  2,211,051
RUBBER BALE CUTTER
Filed May 25, 1939   2 Sheets-Sheet 2
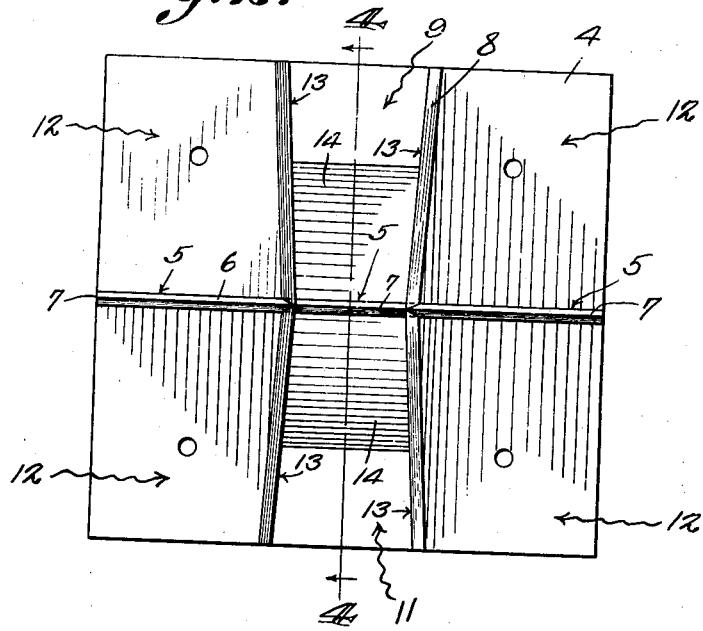
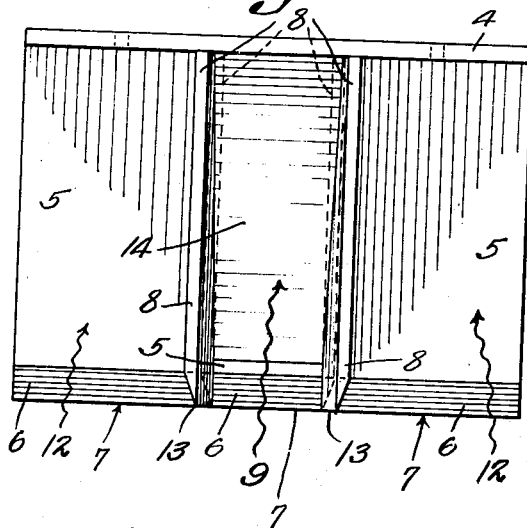
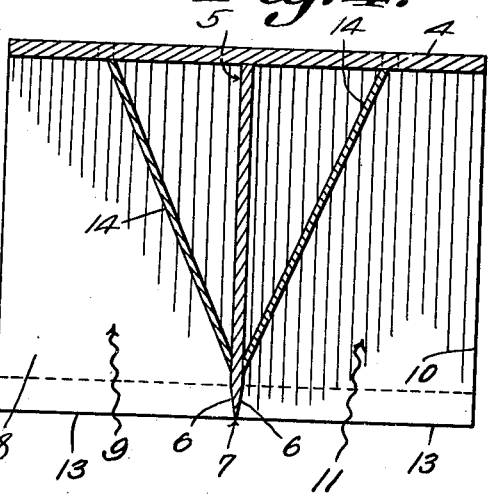
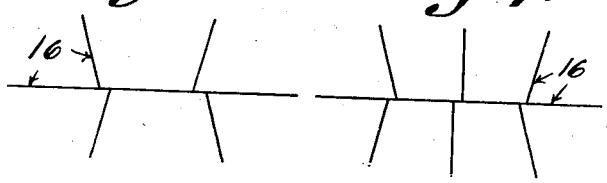
S. Bolling
INVENTOR.
BY  *C. A. Snowles*
ATTORNEYS.

Patented Aug. 13, 1940

2,211,051

UNITED STATES PATENT OFFICE 2,211,051

RUBBER BALE CUTTER

Stewart Bolling, Cleveland, Ohio

Application May 25, 1939, Serial No. 275,765

5 Claims. (Cl. 164—47)

This invention relates to machines designed primarily for cutting bales of rubber consisting of smoked sheets, crepes and other forms of the material, so that the rubber will be properly prepared for crackers, mills and "Banburys."

Heretofore considerable labor, power and time has been consumed in cutting up the bales for the machines but, at best, the mechanisms provided for this purpose have not proved satisfactory. The cutting operation has produced an excessive compression of the material at the center of the bale and this, in turn, has necessitated the expenditure of an excessive amount of power in order to cut through the material. Furthermore, because of the compression and subsequent expansion of the bale sections produced in these machines, it has been extremely difficult to remove the sections from the press and, in view of the fact that these objectionable characteristics are present in all available bale-cutting machines.

The real trouble heretofore with all the bale cutters, a number of which have been patented, is the enormous weight and the excessive power required, which makes them utterly prohibitive to all except the very large companies. The objections to the other smaller and less expensive machines is the fact that they use water to lubricate the blade or saw, to eliminate friction, or else heat the blade to soften the rubber while being cut—both definite disadvantages.

An object of the present invention is to provide a bale cutter having its blades arranged in a new and novel manner whereby compression and resultant resistance to the action of the cutter is reduced to the minimum so that the power required to operate the machine is from 10% to 50% less than that necessary with the best types of machines now known to me, no heat or water being required to effect separation.

It is a further object to so position the blades of the cutter that the separate pieces into which the bale is divided have freedom of movement away from the cutting edges and will not become piled in a central congested area.

Another object is to combine with the blades, where desired, deflecting elements whereby those sections which otherwise might become wedged between certain of the blades, will be shifted away from the adjacent cutting edges.

A further object is to provide a machine which is light, requires little power and because of its low cost of construction and operation, can be used advantageously by small concerns.

A further object is to provide a cutter in which all of the sections resulting from the cutting operation become self-clearing so that no separate operation is necessary to forcibly release any one or more sections from engagement with the blades.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is a perspective view of the upper portion of a bale cutter containing the present improvements, the movable bale-supporting bed being shown in its raised position.

Figure 2 is a bottom plan view of the stationary cutter head.

Figure 3 is a front elevation thereof.

Figure 4 is a section through the cutter head taken from front to rear on the line 4—4, Figure 2.

Figures 5, 6 and 7 are diagrams showing modified arrangements of the blades which might be used.

Referring to the figures by characters of reference, 1 designates the standards of the machine joined at the top by beams 2 constituting the head and mounted for up and down movement between the standards is a bed 3 which can be actuated by any suitable mechanism provided for this purpose. Normally this bed is positioned at such a level that a bale of rubber to be cut can be placed thereon so as to be held beneath the cutter constituting the principal part of the present invention.

As shown in the drawings the cutter comprises a top plate 4 adapted to be secured to the head 2 between standards 1 and in the structure illustrated and which is designed to separate a bale into six sections, there is provided a central transverse blade 5 which extends downwardly therefrom. The bottom portion of the blade has its two sides beveled as at 6 so as to form a continuous cutting edge 7 extending from one side to the other of the cutter.

Depending from plate 4 and interposed between the front edge of said plate and the blade 5 are longitudinal blades 8 which converge toward blade 5 so as to form a pocket 9 the side walls of which are made up of the inwardly converging blades 8 while the inner wall is formed by that portion of blade 5 bridging the space between the blades 8.

Similar blades 10 converge toward blade 5 from the opposite side of the cutter and merge into the blades 8 at their inner ends, these blades 10 also cooperating to form a pocket 11 similar to pocket 9. Corner pockets 12 are produced between the blade 5 and blades 8 and 10 under the corner portions of plate 4 and because of the arrangement of blades illustrated it will be obvious that the corner portions of the pockets 9 and 11 are slightly obtuse while the corner portions of the pockets 12 are slightly acute.

The cutting edges of blades 8 and 10 are located in line with those surfaces of the blades facing the pockets 9 and 11 and each of these blades 8 and 10 is beveled upwardly into the adjacent corner pocket 12 away from its cutting edge. In the drawings the cutting edges of the blades 8 and 10 have been indicated at 13 and they occupy the same plane as the cutting edge 7 of the blade 5. This will be apparent by referring to Figures 3 and 4.

Diverging upwardly from the lower portion of blade 5 within the pockets 9 and 11 are deflectors 14 which extend to the plate 4 and join those blades between which they are located.

In practice the bed 3 is lowered away from the blades of the cutter so that sufficient clearance will be left under the blades to receive the bale of rubber to be cut. The bed is then moved upwardly by any suitable means provided for that service and this will cause the bale to be moved against the cutting edges of the several blades and into the pockets defined by said blades. As each pocket 12 is open at two sides, it will be apparent that those sections of the cut bale entering pockets 12 will be free to shift away from blades 5 and 8 or 10, the beveled portions of the blades inclined upwardly to the pockets constituting deflecting surfaces for starting the severed sections toward the open sides of the pockets.

During the operation of dividing the bale, the cutting edges 13 shear through the bale along lines flush with those faces of the blades 8 and 10 exposed within the pockets 9 and 11 respectively. Therefore there are no bevels at the sides of the intermediate cut portions tending to compress the cut material. The only place where the intermediate sections are engaged by bevels leading to a cutting edge is along that portion of the edge 7 exposed between the pockets. Here, however, the beveled faces tend to eject the cut sections toward the open sides of the pockets. As the pockets gradually increase in width toward their open sides, any transverse pressure within the cut intermediate sections will be gradually relieved as the sections move toward their open sides and this movement is further accelerated by the deflectors 14 which operate to wedge between the intermediate sections as they are separated so as to urge them toward the open sides of the pockets.

As before stated it has been found in practice that by arranging the blades 8 and 10 as herein disclosed, locating the cutting edges 13 as illustrated, and providing the wedging or deflecting means 14, the power heretofore required to cut through a bale of rubber is reduced to approximately one-tenth of that ordinarily employed. Furthermore no hard manual labor is required for the purpose of extracting the cut sections from between the blades of the cutter.

Although the cutter shown and described is for use in severing a bale into six sections, it is to be understood that the number of blades could be increased so as to produce more than six sections. For example the pockets 9 and 11 could be made wider and could be intersected by a central cutting blade disposed at right angles to the blade 5. Such a modification is so obvious that an illustration and a detailed description thereof is not deemed necessary.

It has been found in practice that a machine such as illustrated will cut any standard boxed bale into six self-clearing pieces at one stroke and at the rate of twenty-five bales per hour. Because of the self-clearing property of the cutter, the complicated means heretofore used for supplying water or heat in cutting either soft or frozen bales is not necessary. On the contrary bales in any condition will be properly divided with the expenditure of the minimum power, time and labor. Furthermore where additional blades are provided as herein stated, a machine will operate efficiently to divide burlap wrapped bales conforming to no special standards of size or shape.

While the preferred arrangement of blades has been shown in Figure 2, other arrangements can be employed as in Figures 5 to 7 wherein the blades have been indicated at 15.

What is claimed is:

1. In a machine for cutting rubber bales, a cutter head including blades positioned to define corner pockets each open on two sides and opposed intermediate pockets each open at its outer side, each intermediate pocket being of a width gradually increasing toward its open outer side, and means positioned between the opposed intermediate pockets for wedging between and spreading cut bale sections in said pockets.

2. In a machine for cutting rubber bales, a cutter head including blades positioned to define corner pockets each open on two sides and opposed intermediate pockets each open at its outer side, each intermediate pocket being of a width gradually increasing toward its open outer side, the cutting edges of the opposed blades forming the sides of the intermediate pockets being in the same plane with those faces of said blades exposed within the pockets, wedging means within each of the intermediate pockets positioned for movement between and outward displacement of cut bale sections in said pockets.

3. A self-clearing cutter for rubber bales including connected blades diverging to provide separate pockets for the reception of the sections of the bale as they are cut, each pocket having an open side and the transverse area of each pocket increasing toward its open side, wedging means within each of the intermediate pockets positioned for movement between and outward displacement of cut bale sections in said pockets.

4. A self-clearing cutter for rubber bales including a straight cross blade, spaced diverging blades extending from each side of the cross blade, and wedging means at opposite sides of the cross blade and between the diverging blades.

5. A self-clearing cutter for rubber bales including a straight cross blade and spaced diverging blades extending from each side of the cross blade, and cooperating to form intermediate pockets each open at one side, each pocket increasing in transverse area toward said open side, and a wedging means in each intermediate pocket positioned to displace a cut bale section in said pocket toward the open side.

STEWART BOLLING.